(12) United States Patent
Al-Jafar

(10) Patent No.: US 8,238,200 B2
(45) Date of Patent: Aug. 7, 2012

(54) TIMEPIECE WITH MULTIPLICATION TABLE DISPLAY AND METHOD OF TEACHING MULTIPLICATION TABLES

(75) Inventor: Ali Ashour Al-Jafar, Kuwait (KW)

(73) Assignee: Kuwait University, Safat (KW)

( * ) Notice: Subject to any disclaimer, the term of this patent is extended or adjusted under 35 U.S.C. 154(b) by 106 days.

(21) Appl. No.: 12/914,845

(22) Filed: Oct. 28, 2010

(65) Prior Publication Data

US 2011/0044135 A1    Feb. 24, 2011

Related U.S. Application Data

(63) Continuation-in-part of application No. 12/113,328, filed on May 1, 2008, now abandoned.

(51) Int. Cl.
*G04B 47/00* (2006.01)
*G04B 19/04* (2006.01)
*G09B 19/00* (2006.01)

(52) U.S. Cl. .............. 368/10; 368/80; 368/228; 434/209

(58) Field of Classification Search .................... 368/10, 368/21, 80, 223, 228; 235/78 M, 88 M, 61 F; 434/209, 394
See application file for complete search history.

(56) References Cited

U.S. PATENT DOCUMENTS

| | | |
|---|---|---|
| 1,662,503 A | 3/1928 | Krieger |
| 2,305,508 A | 12/1942 | Woodruff |
| 2,567,497 A | 9/1951 | Sorensen |
| 2,908,439 A | 10/1959 | Evans |
| 2,910,825 A | 11/1959 | Merseman |
| 3,624,928 A | 12/1971 | Felton |
| 3,654,438 A | 4/1972 | Wyatt et al. |
| 3,940,920 A | 3/1976 | Nakamura et al. |
| 3,982,104 A | 9/1976 | Banner |
| 4,035,617 A | 7/1977 | Banner |
| 4,445,867 A | 5/1984 | Berg et al. |
| 4,717,260 A | 1/1988 | Tsuji |
| 5,168,479 A | 12/1992 | Lima |
| 5,827,067 A | 10/1998 | Perez |
| 5,967,787 A | 10/1999 | Tsao |
| 6,006,986 A | 12/1999 | Whalen |
| 6,198,698 B1 | 3/2001 | Graves |
| 6,222,796 B1 | 4/2001 | Rosen |
| 6,269,054 B1 | 7/2001 | Truini |
| 7,009,915 B2 | 3/2006 | Brewer et al. |
| 7,050,357 B1 | 5/2006 | Garcia |
| 7,065,886 B2 | 6/2006 | Segur |
| 2002/0163858 A1 | 11/2002 | Greenwood |
| 2005/0105397 A1 | 5/2005 | Tuason |

OTHER PUBLICATIONS http://robinsunne.com/robinsunnes_multiplication_clock, Oct. 16, 2007.

*Primary Examiner* — Vit Miska
(74) *Attorney, Agent, or Firm* — Richard C. Litman

(57) ABSTRACT

A timepiece with a multiplication table display is provided. Preferably, the timepiece has a programmable display, such as a liquid crystal display or the like, allowing the display to display the present time to the user, as is conventionally known, as well as providing methods of performing and teaching multiplication. A first multiplier is selected by the user, and the first multiplier is displayed in a central region of the display. A second multiplier is then selected by the user, and the user may use the display of the timepiece to calculate a particular product, or may be graphically shown how the product is calculated.

6 Claims, 16 Drawing Sheets

TIMEPIECE WITH MULTIPLICATION TABLE DISPLAY AND METHOD OF TEACHING MULTIPLICATION TABLES

CROSS-REFERENCE TO RELATED APPLICATIONS

This application is a continuation-in-part of U.S. patent application Ser. No. 12/113,328, filed on May 1, 2008 now abandoned.

BACKGROUND OF THE INVENTION

1. Field of the Invention

The present invention relates to timepieces, and particularly to a timepiece with multiplication table display and a method of teaching multiplication tables using the timepiece.

2. Description of the Related Art

Elementary devices and tools for teaching multiplication tables are known. Such devices and tools include flashcards, workbooks, rote memory techniques, repetitive written exercises and a wide variety of both mechanical and electronic devices. Such known instructional devices and methods often require considerable conceptual and physical dexterity by the user and may be particularly discouraging to students in the elementary school grades and students having a learning or physical disability.

In addition, such instructional devices and methods are not readily adaptable for independent and self-instruction and easy recognition of the correctness of the attempted mathematical function. Further, particularly with electronic devices, the teaching system or method may be unable to ensure an understanding of the theory of mathematical functions, such as the fundamentally additive nature of multiplication. Still further, conventional instructional devices may require considerable manufacturing processes and the devices themselves may be of considerable size and weight.

Thus, a timepiece with a multiplication table display and method of teaching multiplication tables solving the aforementioned problems is desired.

SUMMARY OF THE INVENTION

The timepiece having a multiplication table display may be in the form of a watch, a clock or the like. Preferably, the timepiece has a programmable and controllable display, such as a liquid crystal display (LCD) or the like. A face of the timepiece is divided into a central region and a circumferential region. A first multiplier N is selected, where N is an integer between one and twelve, and the first multiplier N is displayed in the central region.

The circumferential region is divided into N annular portions, and these N annular portions are displayed to the user on the display. A set of integers $x_{N(y)}$ are displayed respectively about each of the N annular portions of the circumferential region, where y is an integer ranging between one and twelve such that $x_{1(1)}$ to $x_{1(12)}$ ranges between one and twelve to simulate a face of a conventional analog timepiece, and $x_{N(y)} = x_{1(y)} + (N-1) \times 12$.

A simulated hour hand and a simulated minute hand are displayed on the face of the timepiece. The simulated hour hand and the simulated minute hand are positioned with respect to an innermost annular portion of the circumferential region to indicate the present time. Alternatively, analog clockworks may be incorporated into the timepiece, with mechanical hour and minute hands being used in combination with the variable display face of the timepiece.

The user selects a second multiplier M, where M is an integer between one and twelve, and identifies the second multiplier M in the N=1 annular portion of the circumferential region. When used as a teaching aid, the second multiplier M in the N=1 annular portion of the circumferential region may be highlighted or otherwise visually identified to the user following the user's selection of the second multiplier.

To perform the multiplication, the user makes a sequence of clockwise steps from the second multiplier M to the value of $x_{N(y)}$ equaling N×M. If the product of N×M is greater than twelve, the sequence of clockwise steps follows a clockwise path to each multiple of twelve within a respective one of the N annular portions and continues into the next higher annular portion, with the number of the clockwise steps being given by (N−1)×M. When used as a teaching aid, the steps are visually indicated to the user by sequentially highlighting each numeral along the clockwise path or otherwise visually indicating the steps, with the number of the clockwise steps being given by (N−1)×M.

Alternatively, rather than having a programmable variable display, a kit of twelve analog timepieces may be provided. Each timepiece includes a face divided into a central region and a circumferential region, and an integer value N between one and twelve displayed in the central region of the face thereof. As in the previous embodiment, N represents a first multiplier, and each face has a circumferential region divided into N annular portions. A set of integers $x_{N(y)}$ are respectively displayed about each of the N annular portions of each circumferential region, where y is an integer ranging between one and twelve such that $x_{1(1)}$ to $x_{1(12)}$ ranges between one and twelve, and $x_{N(y)} = x_{1(y)} + (N-1) \times 12$. Each individual timepiece would be used in a manner similar to that of the previous embodiment. Each of the N timepieces represents a single multiplication table.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
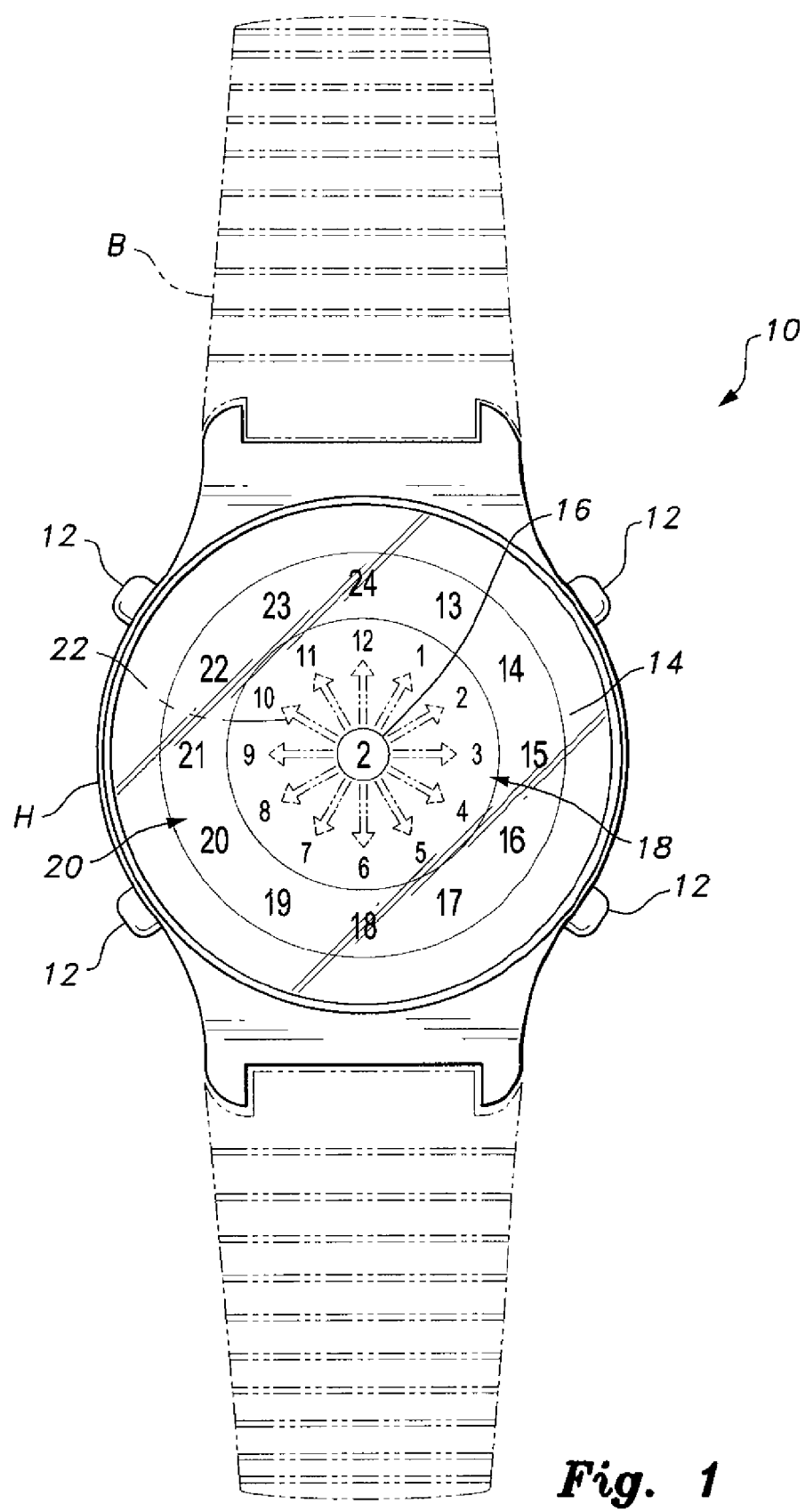
FIG. 1 is a plan view of an exemplary timepiece with a multiplication table display according to the present invention, the face of the timepiece presenting a multiplication table for the number "2".

The timepiece having a multiplication table display is a working timepiece that tells time, but also has a face that facilitates methods of teaching and performing multiplication, particularly to elementary school children. The timepiece may be a watch, a clock or the like. In FIG. 1, the timepiece 10 is shown as being configured as a conventional wristwatch, although it should be understood that the watch 10 is shown for exemplary purposes only.

The exemplary watch 10 of FIG. 1 includes a conventional housing H, a watch band B, a set of control buttons 12, as are conventionally known in the art of digital watches and the like, and a face 14. Preferably, the face 14 is a programmable and controllable display, such as a liquid crystal display or the like. Timepieces with variable, programmable and controllable faces utilizing liquid crystal displays and the like are known in the art. Examples of such timepieces are shown in U.S. Pat. Nos. 6,198,698; 6,222,796; 6,269,054; and 7,009,915, each of which is herein incorporated by reference in its entirety.

Figure 2:
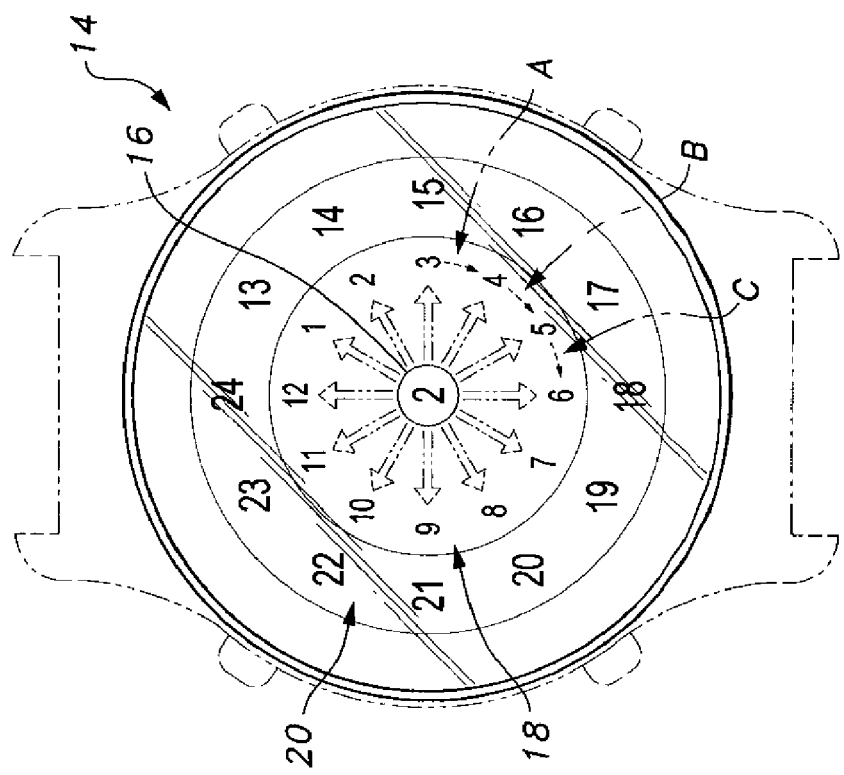
FIG. 2 is a plan view of the exemplary timepiece of FIG. 1, annotated to show a method of using the timepiece to teach a multiplication table for multiples of two.

As shown in FIGS. 1 and 2, the display 14 is divided into a central region 16 and a circumferential region. As will be described in detail below, the circumferential region in the particular example of FIGS. 1 and 2 is divided into two annular portions 18, 20. A first multiplier N is selected, where N is an integer between one and twelve, and the first multiplier N is displayed in the central region 16. In the particular example of FIGS. 1 and 2, N is equal to two, thus the display 14 of watch 10 is used for performing and teaching the multiplication table for a multiplier of two.

The circumferential region is divided into N annular portions (portions 18 and 20 in the N=2 example of FIGS. 1 and 2), and these N annular portions are displayed to the user on the display 14, as shown. A set of integers $x_{N(y)}$ are displayed respectively about each of the N annular portions of the circumferential region, where y is an integer ranging between one and twelve such that $x_{1(1)}$ to $x_{1(12)}$ ranges between one and twelve to simulate a face of a conventional analog timepiece, and $x_{N(y)} = x_{1(y)} + (N-1) \times 12$. In other words, $x_{1(1)}$ to $X_{1(12)}$ represents the innermost portion 18, ranging from one to twelve, as in a conventional timepiece. The second, or outermost, portion 20 ranges from thirteen to twenty-four. The numeral one in portion 18 is radially aligned with the numeral thirteen in the outermost portion 20, the numeral two in portion 18 is radially aligned with the numeral fourteen in the outermost portion 20, etc. Each numeral in the outermost portion is (N−1)×12 greater than the corresponding numeral in the innermost portion. In this example, each numeral in the outermost portion is twelve times greater than the corresponding numeral in the innermost portion.

A simulated hour hand and a simulated minute hand are displayed on the face of the timepiece (indicated by dashed lines 22 in FIG. 1), with the simulated hour hand and the simulated minute hand being positioned with respect to an innermost annular portion 18 of the circumferential region to indicate the present time. Alternatively, analog clockworks may be incorporated into the timepiece 10, with mechanical hour and minute hands being used in combination with the variable display face 14 of the timepiece 10.

The user selects a second multiplier M, where M is an integer between one and twelve, and identifies the second multiplier M in the N=1 annular portion of the circumferential region. In the example of FIG. 2, the second multiplier M is equal to three, thus the multiplication to be performed is 2×3. When used as a teaching aid, the second multiplier M in the N=1 annular portion of the circumferential region may be highlighted or otherwise visually identified to the user following the user's selection of the second multiplier. The user uses the controls 12 of the timepiece 10 to select both the first and second multipliers.

To perform the multiplication, the user makes a sequence of clockwise steps from the second multiplier M to the value of $x_{N(y)}$ equaling N×M. If the product of N×M is greater than twelve, the sequence of clockwise steps follows a clockwise path to each multiple of twelve within a respective one of the N annular portions and continues into the next higher annular portion, with the number of the clockwise steps being given by (N−1)×M. When used as a teaching aid, the steps are visually indicated to the user, by sequentially highlighting each numeral along the clockwise path or otherwise visually indicating the steps, with the number of the clockwise steps being given by (N−1)×M.

In the example of FIG. 2, where 2×3 is to be calculated, the process begins at the numeral "3" within innermost portion 18. The number of clockwise steps is given by (N−1)×M=(2−1)×3=3. Three clockwise steps (indicated as A, B and C in FIG. 2) are then made from the numeral "3", yielding the answer of "6". If the user were to select 2×11, for example, then the number of clockwise steps from M=11 would be given by (N−1)×M=(2−1)×11=11. Starting from M=11 in the innermost portion 18, the user would make one clockwise step to "12" and then proceed another ten clockwise steps around the outermost portion 20, yielding the answer of "22".

As noted above, the timepiece 10 may be used either to perform the multiplication, following the process above, with the user mentally counting the clockwise steps, or the timepiece 10 may be used as a teaching aid, with the steps being visually indicated to the user.

Figure 3:
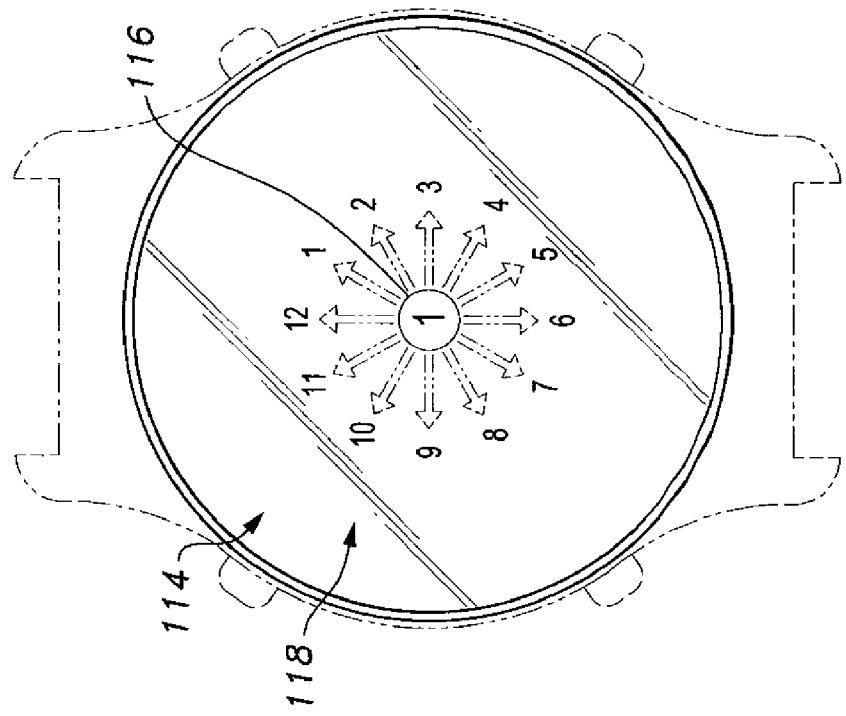
FIG. 3 is a plan view of an exemplary timepiece with a multiplication table display according to the present invention, the face of the timepiece presenting a multiplication table for the number "1".
Figure 5:
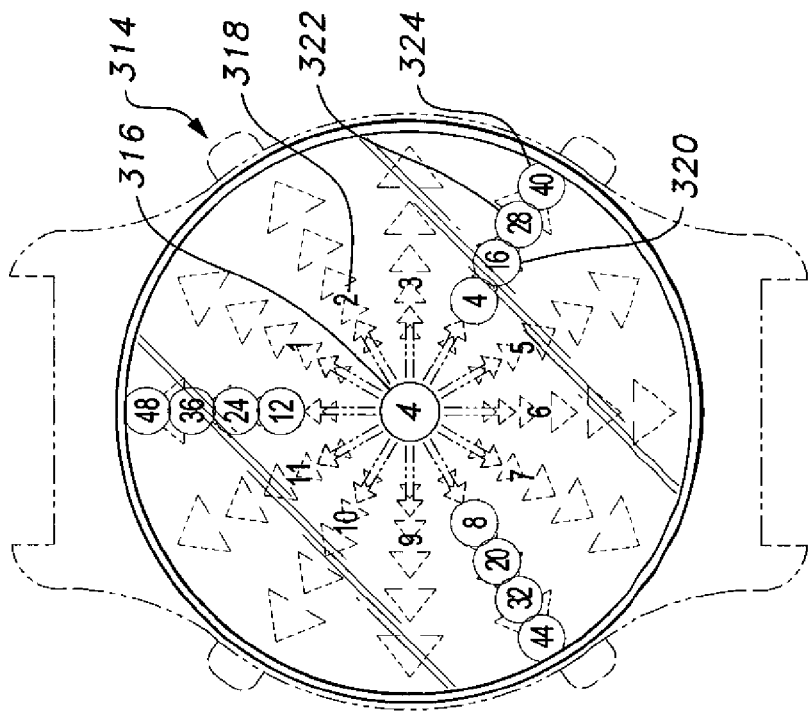
FIG. 5 is a plan view of an exemplary timepiece with a multiplication table display according to the present invention, the face of the timepiece presenting a multiplication table for the number "4".
Figure 4:
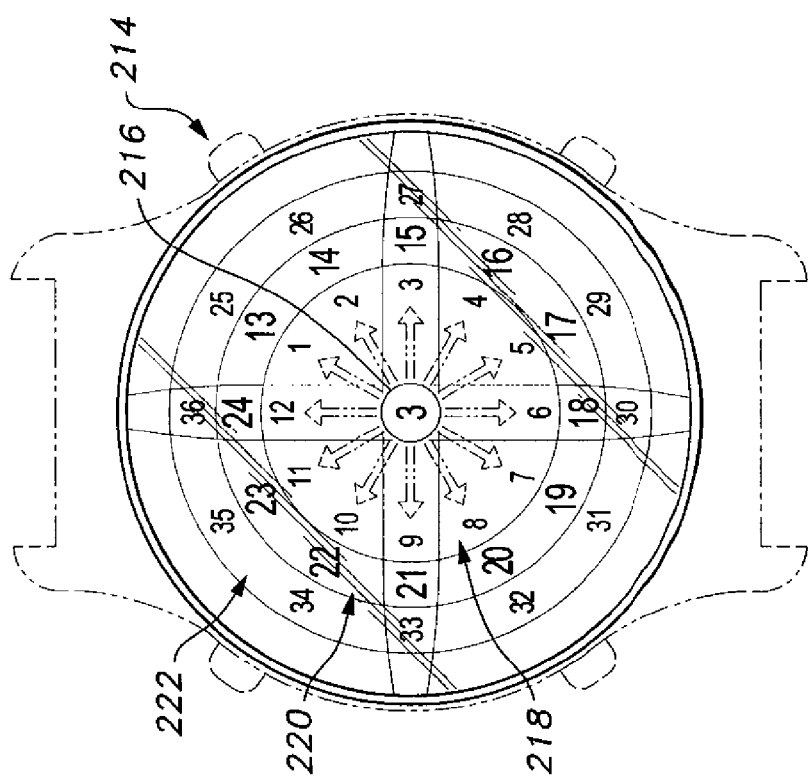
FIG. 4 is a plan view of an exemplary timepiece with a multiplication table display according to the present invention, the face of the timepiece presenting a multiplication table for the number "3".
Figure 6:
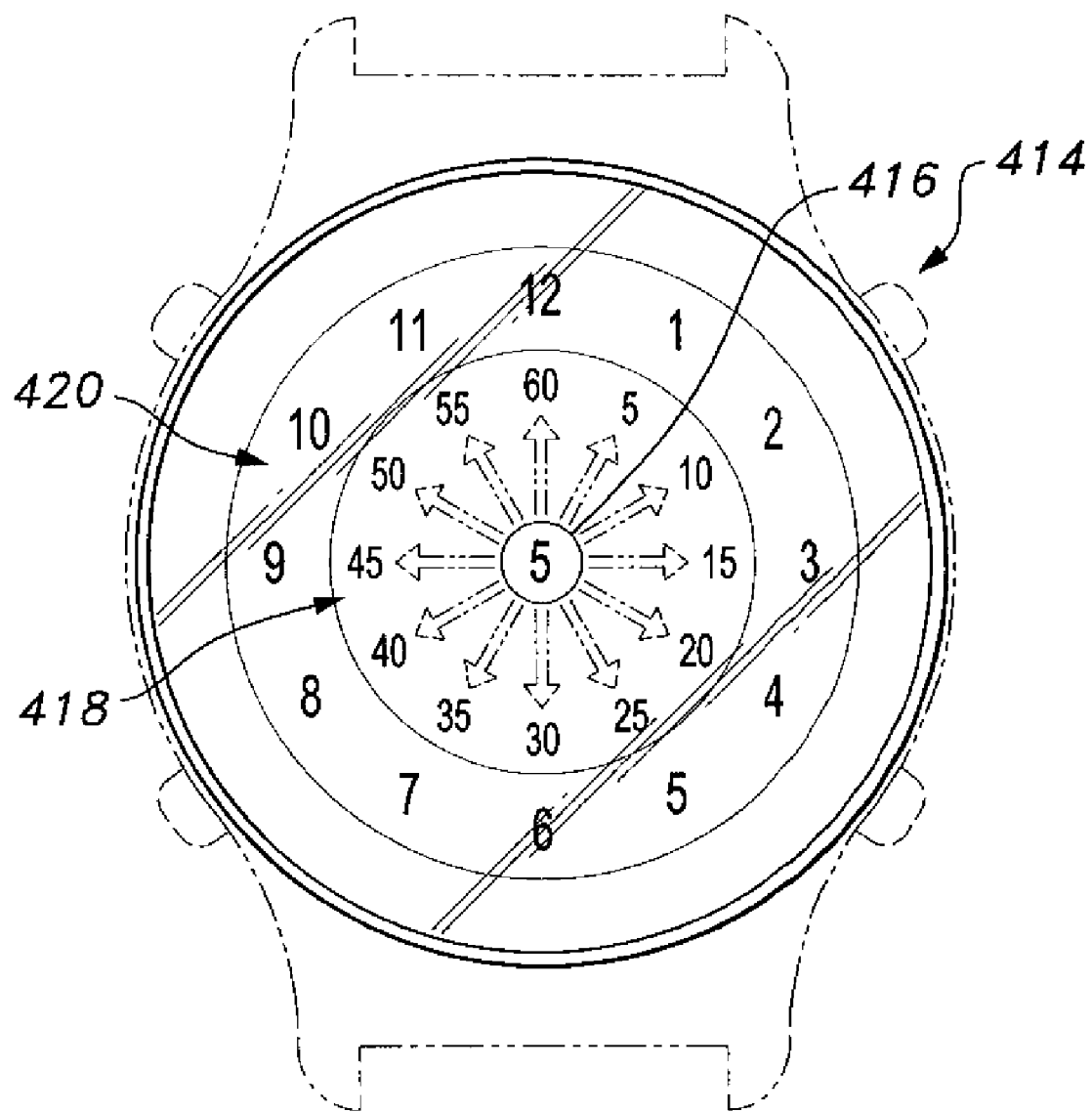
FIG. 6 is a plan view of an exemplary timepiece with a multiplication table display according to the present invention, the face of the timepiece presenting a multiplication table for the number "5".

FIG. 3 illustrates display 114, similar to display 14, but with N=1 being shown in central display 116. The circumferential region only has N=1 portions, shown as a conventional annular display region 118. FIG. 4 illustrates display 214 for N=3, shown in central display 216. The circumferential region has N=3 annular portions 218, 220, 222, respectively. FIG. 5 illustrates display 314 for N=4, shown in central display 316. The circumferential region has N=4 annular portions 318, 320, 322, 324, respectively. Given the programmable and variable nature of the display, the configuration of the portions is controllable by the user. In the example of FIG. 6, display 414 has N=5 displayed in central region 416. Rather than the multiplication display as described above, the user may select an innermost display region 418 showing multiples of five that correspond to minutes, in combination with a conventional outer annular display 420.

Figure 7:
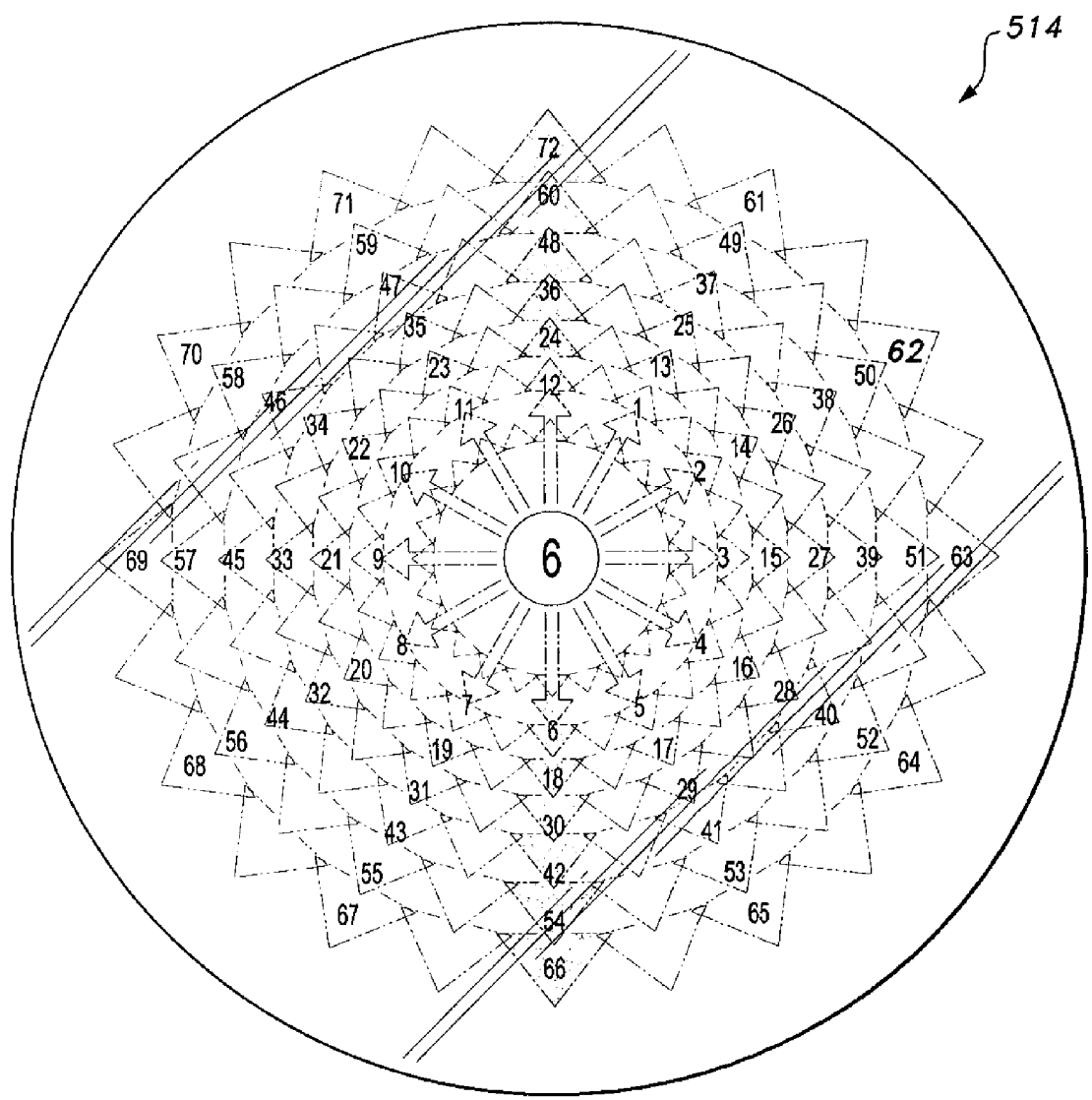
FIG. 7 is a plan view of an exemplary timepiece with a multiplication table display according to the present invention, the face of the timepiece presenting a multiplication table for the number "6".
Figure 8:
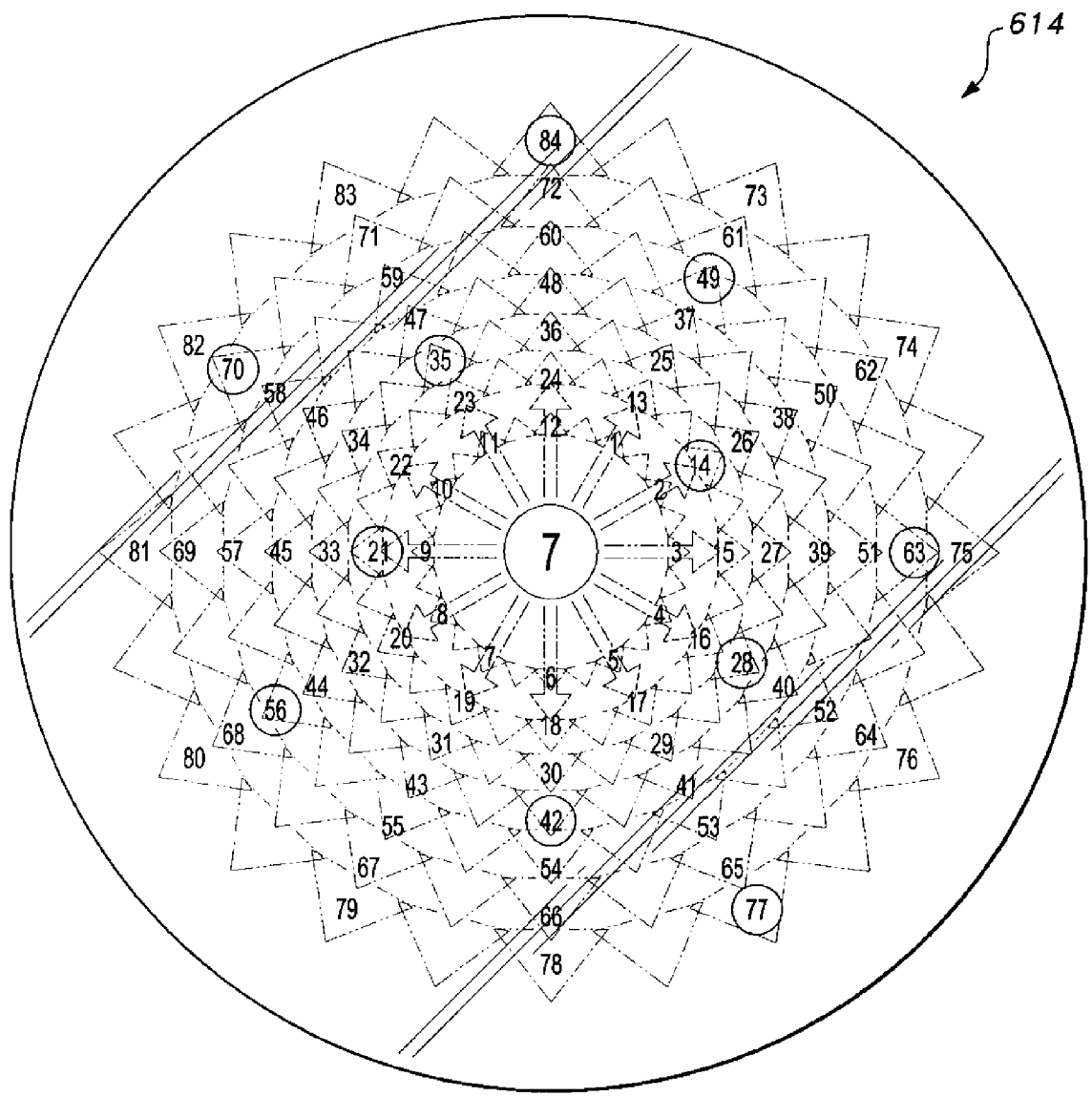
FIG. 8 is a plan view of an exemplary timepiece with a multiplication table display according to the present invention, the face of the timepiece presenting a multiplication table for the number "7".
Figure 9:
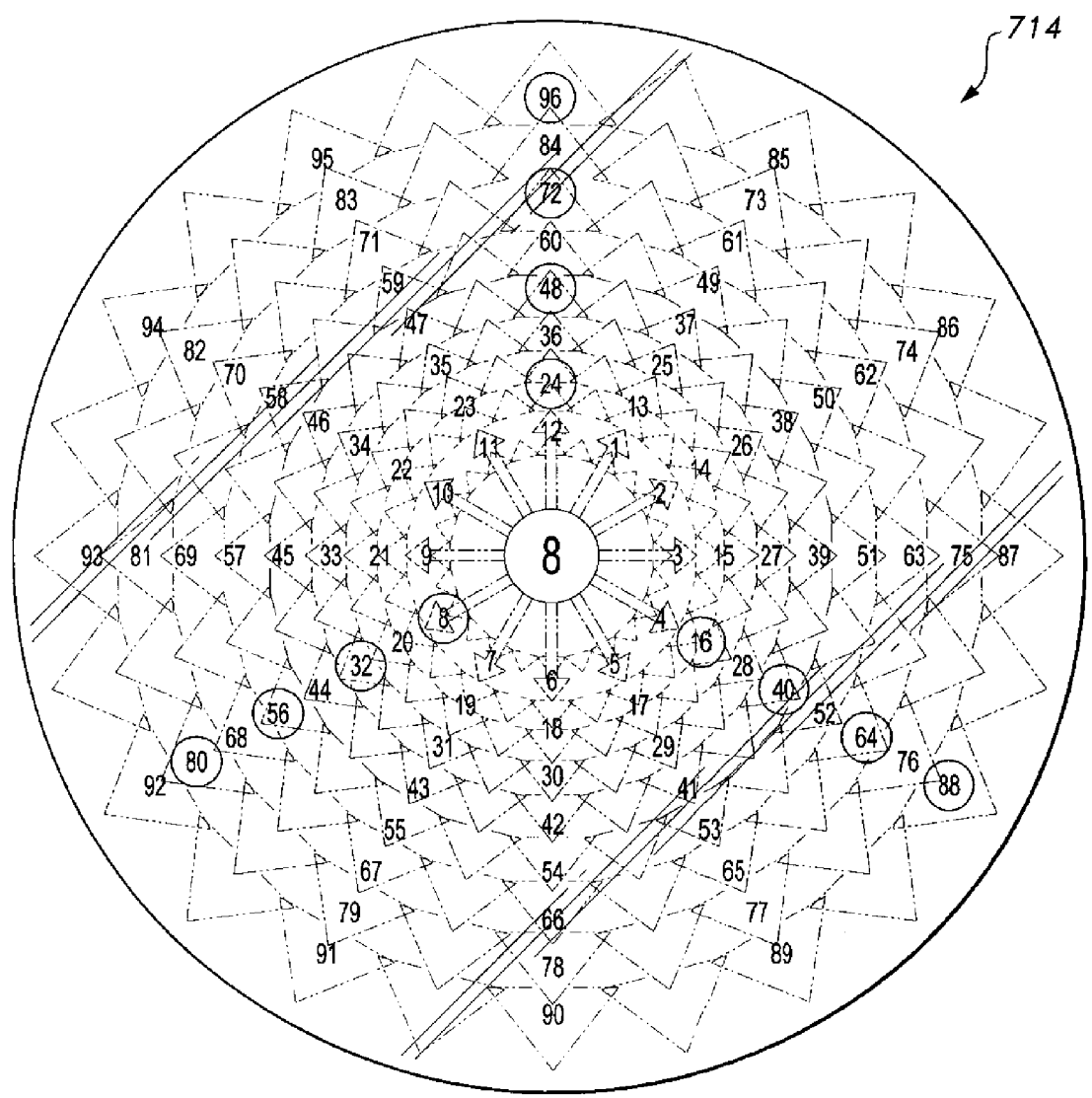
FIG. 9 is a plan view of an exemplary timepiece with a multiplication table display according to the present invention, the face of the timepiece presenting a multiplication table for the number "8".
Figure 10:
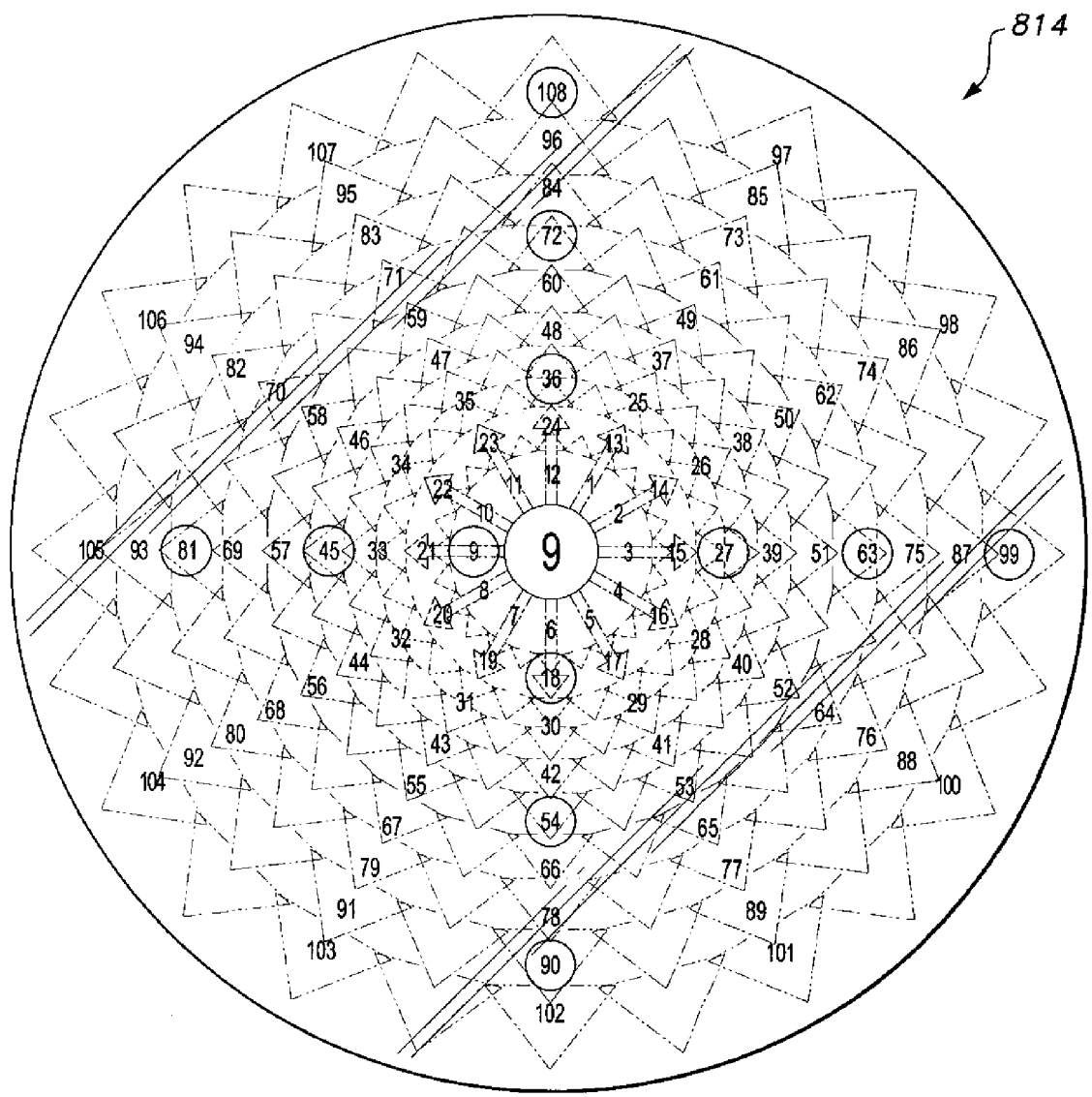
FIG. 10 is a plan view of an exemplary timepiece with a multiplication table display according to the present invention, the face of the timepiece presenting a multiplication table for the number "9".
Figure 11:
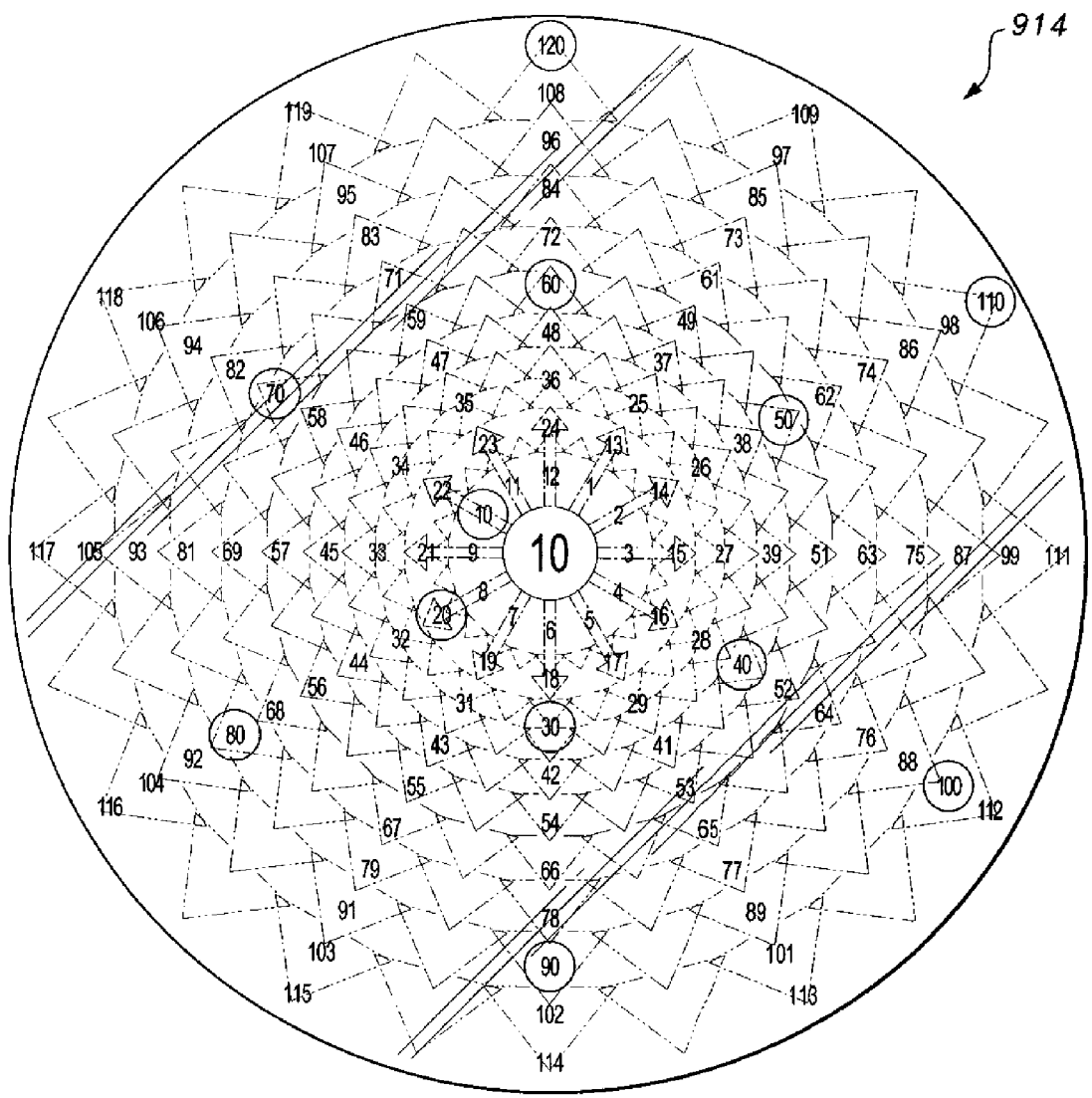
FIG. 11 is a plan view of an exemplary timepiece with a multiplication table display according to the present invention, the face of the timepiece presenting a multiplication table for the number "10".
Figure 12:
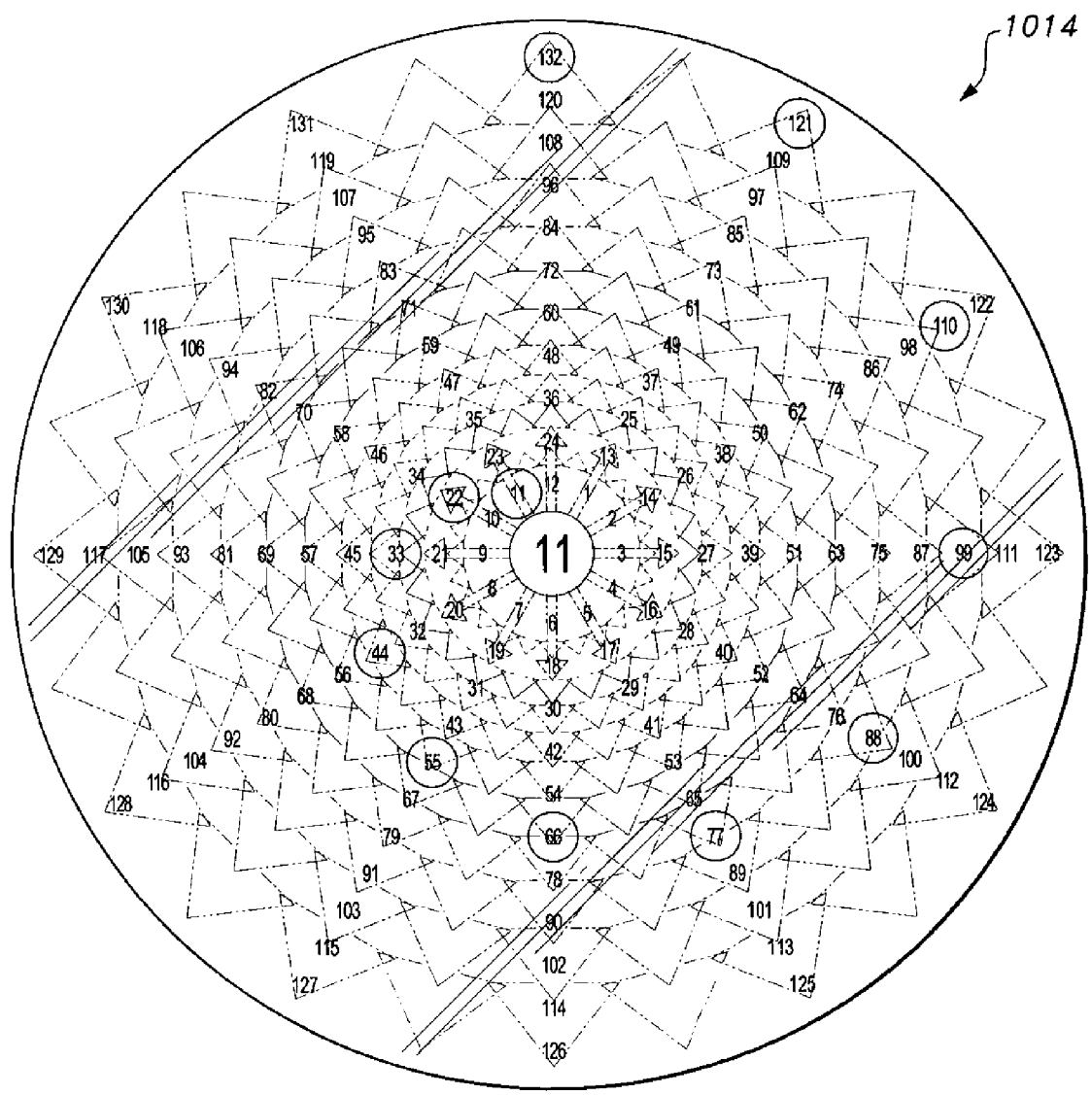
FIG. 12 is a plan view of an exemplary timepiece with a multiplication table display according to the present invention, the face of the timepiece presenting a multiplication table for the number "11".
Figure 13:
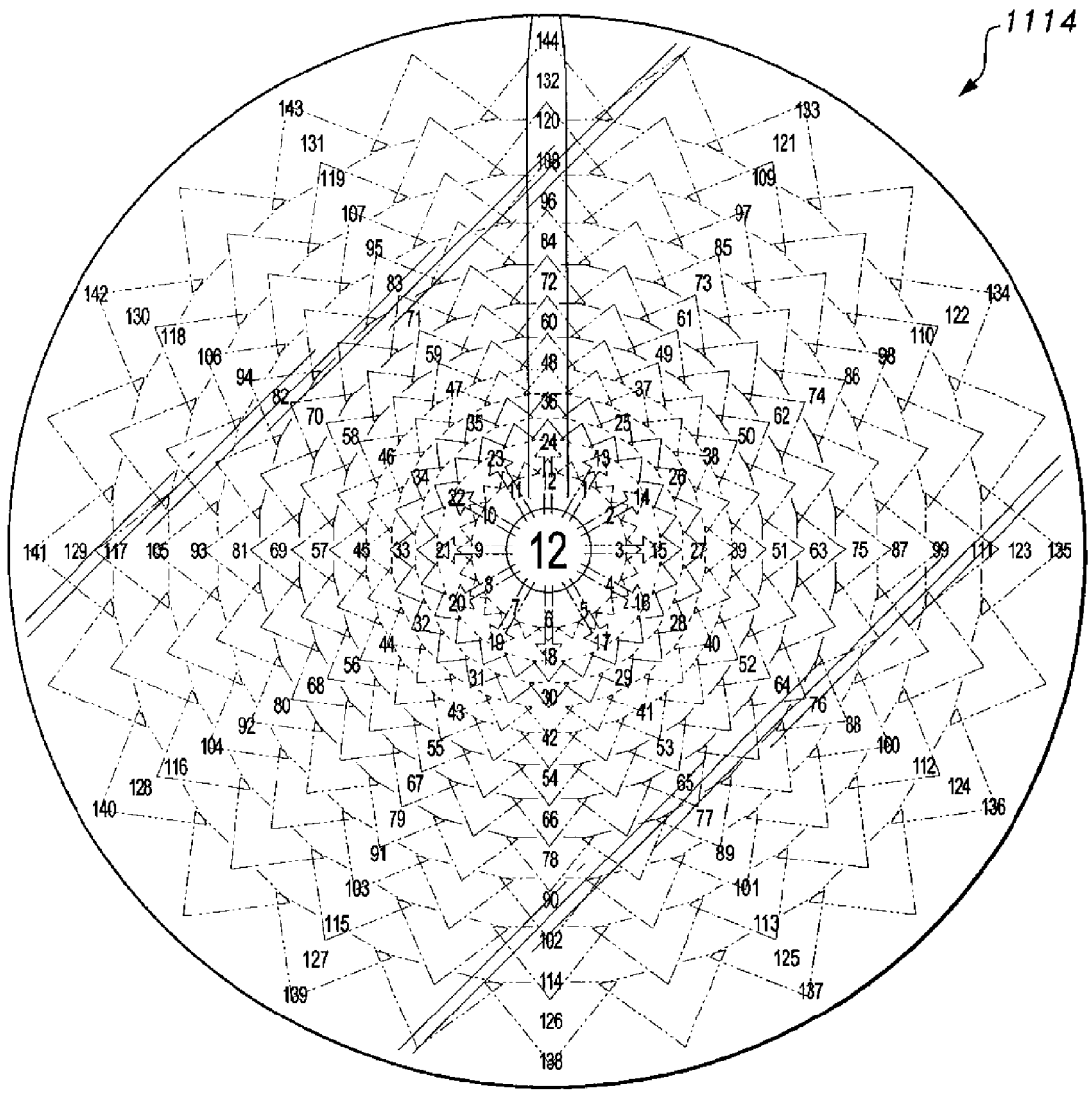
FIG. 13 is a plan view of an exemplary timepiece with a multiplication table display according to the present invention, the face of the timepiece presenting a multiplication table for the number "12".

It should be understood that the particular configurations for each display corresponding to a particular value of N are shown in the respective Figures for exemplary purposes only. FIG. 7 illustrates an exemplary display 514 for N=6, with the circumferential region being divided into N=6 annular portions. Similarly, FIG. 8 illustrates an exemplary display 614 for N=7, with the circumferential region being divided into N=7 annular portions; FIG. 9 illustrates an exemplary display 714 for N=8, with the circumferential region being divided into N=8 annular portions; FIG. 10 illustrates an exemplary display 814 for N=9, with the circumferential region being divided into N=9 annular portions; FIG. 11 illustrates an exemplary display 914 for N=10, with the circumferential region being divided into N=10 annular portions; FIG. 12 illustrates an exemplary display 1014 for N=11, with the circumferential region being divided into N=11 annular portions; and FIG. 13 illustrates an exemplary display 1114 for N=12, with the circumferential region being divided into N=12 annular portions.

Figure 14:
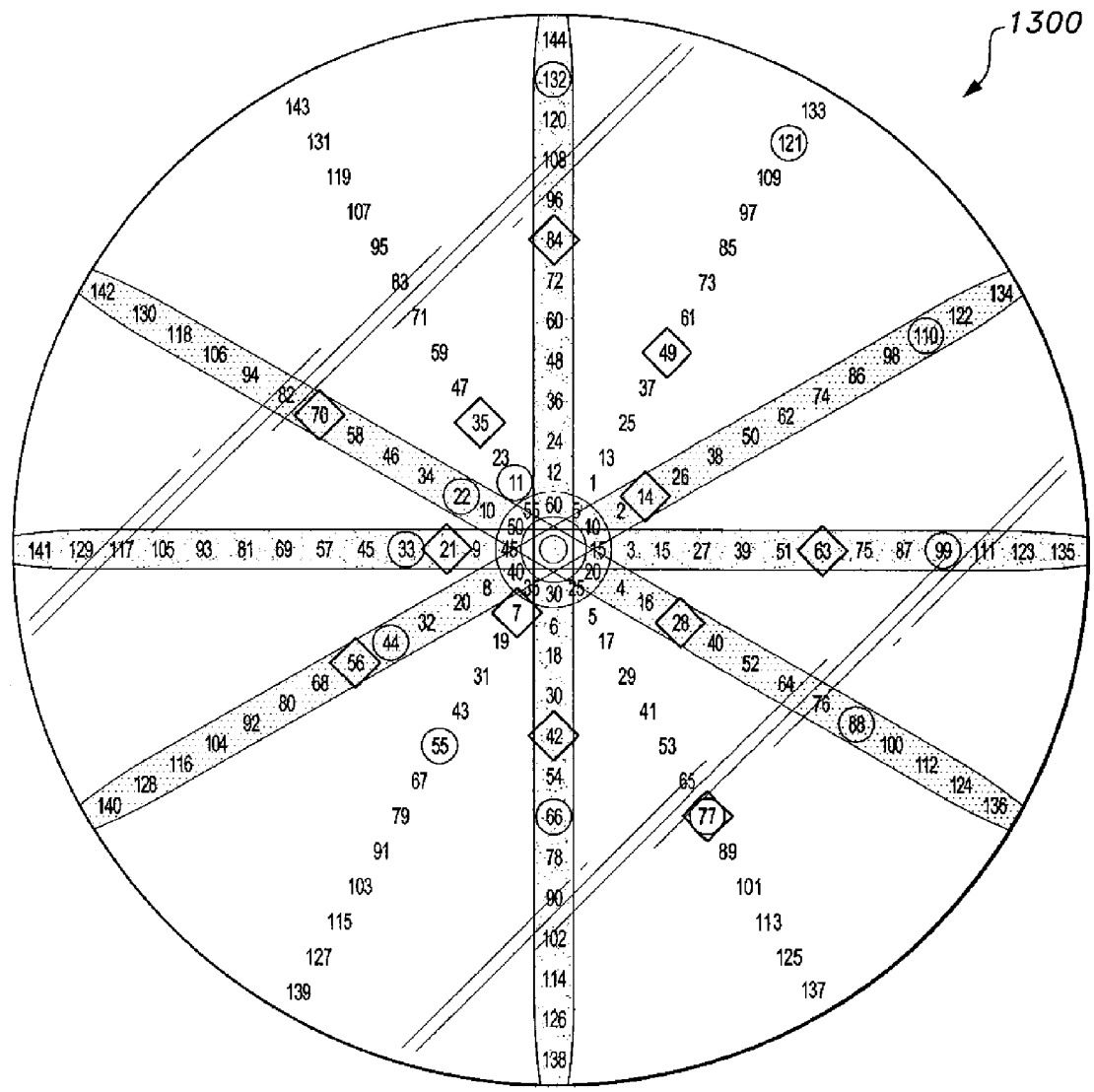
FIG. 14 is a plan view of an alternative embodiment of a timepiece with a multiplication table display according to the present invention.
Figure 15:
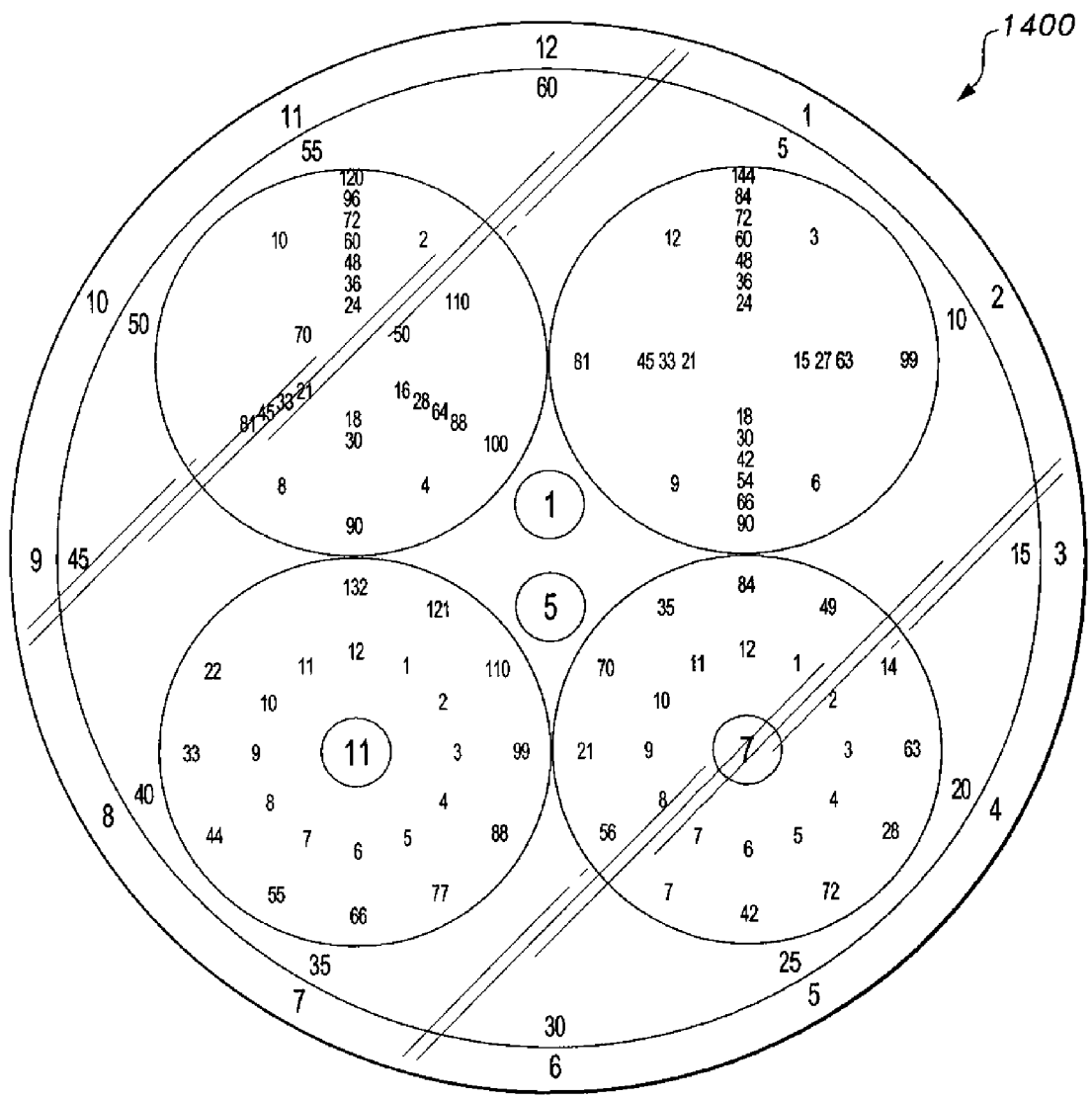
FIG. 15 is a plan view of an alternative embodiment of a timepiece with a multiplication table display according to the present invention, the face of the timepiece presenting a multiplication table for the number "4".

As noted above, the configuration of the display is dependent upon the needs and desires of the user. FIGS. 14 and 15 illustrate further exemplary displays 1300 and 1400, which may be selected and controlled by the user.

Figure 16A:
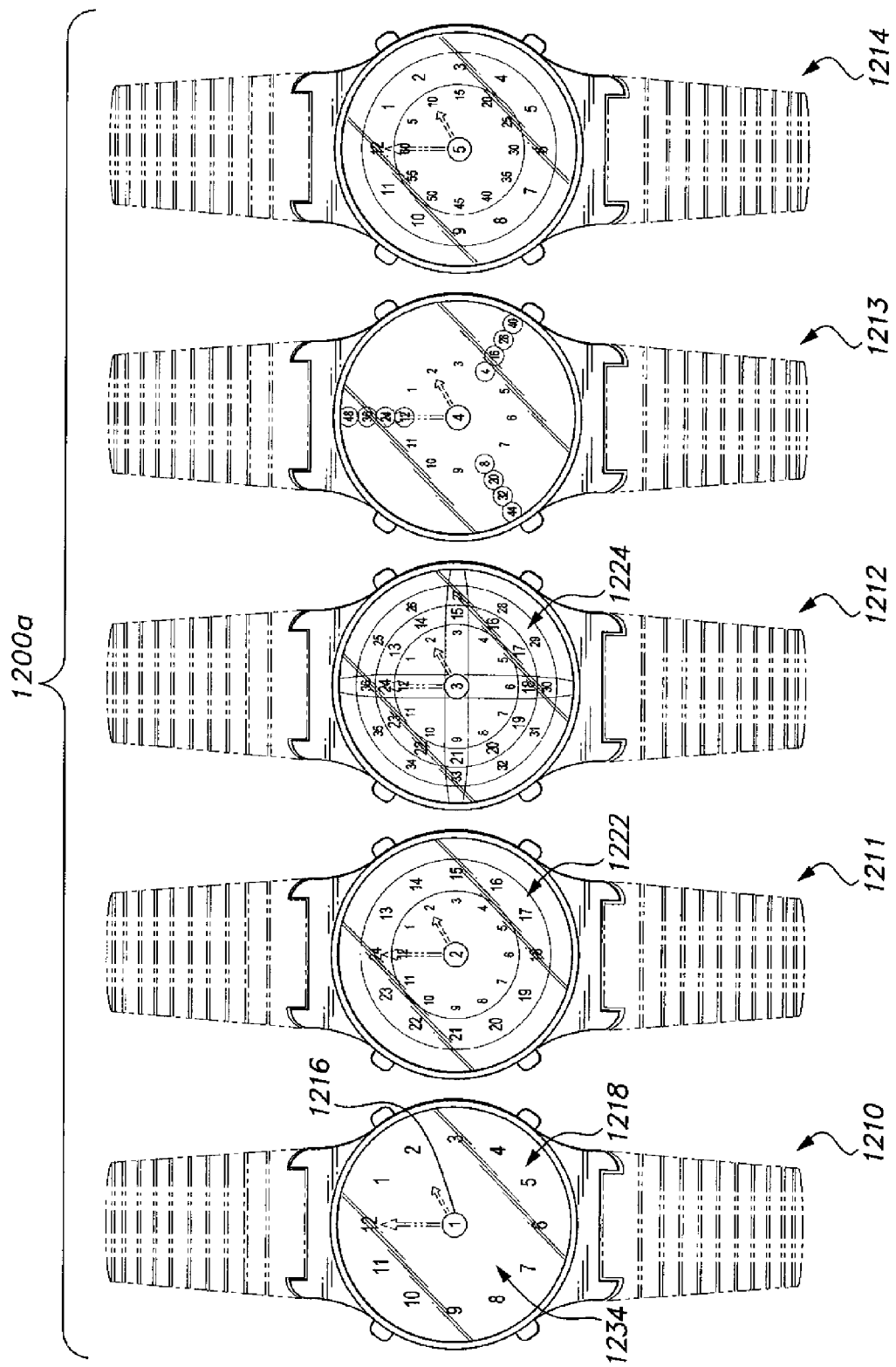
FIGS. 16A, 16B and 16C are plan views of an exemplary kit of analog timepieces with a multiplication table display according to the present invention, each timepiece in the kit having a face adapted for teaching a unique multiplication table.
Figure 16B:
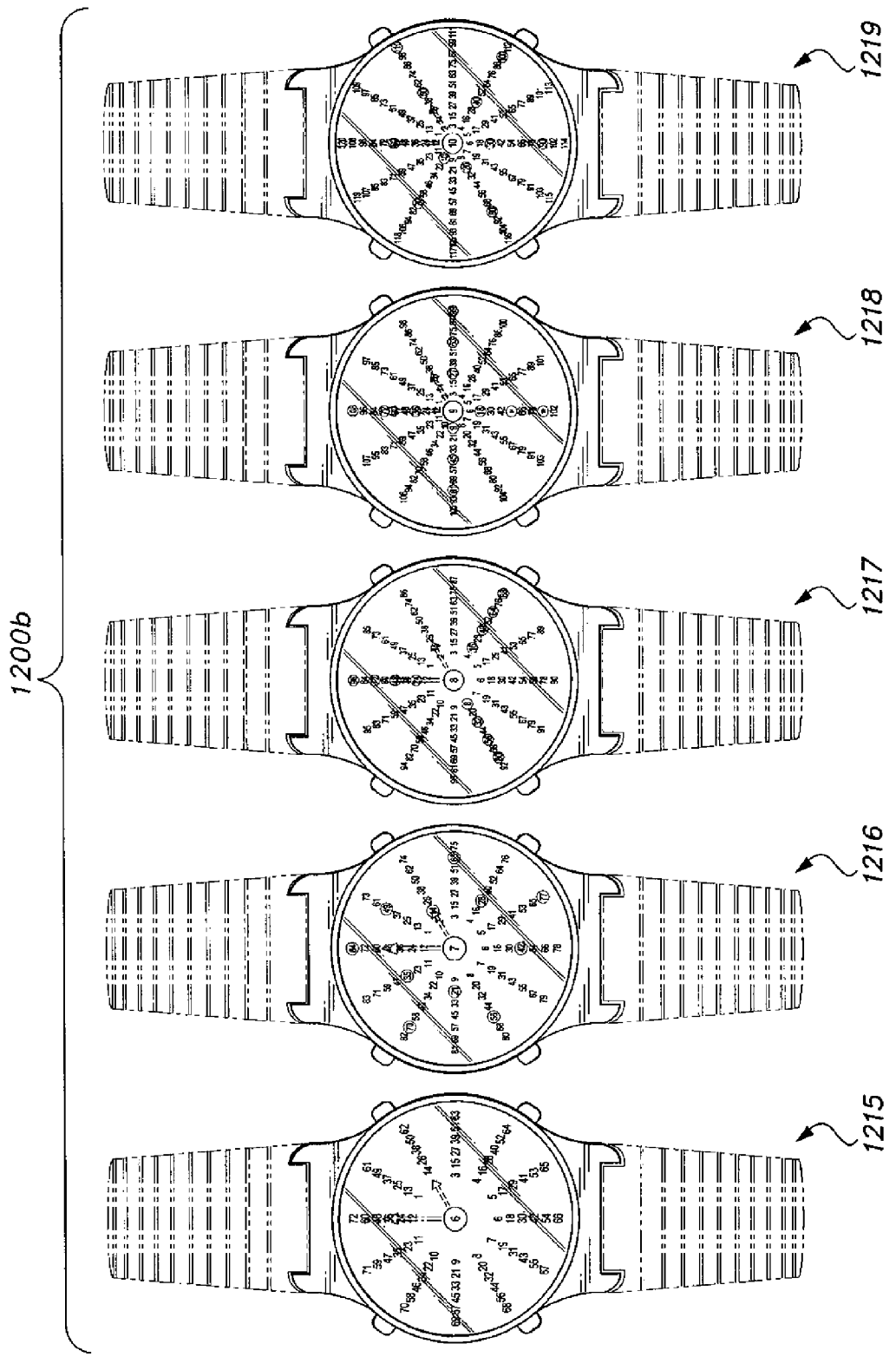
Figure 16C:
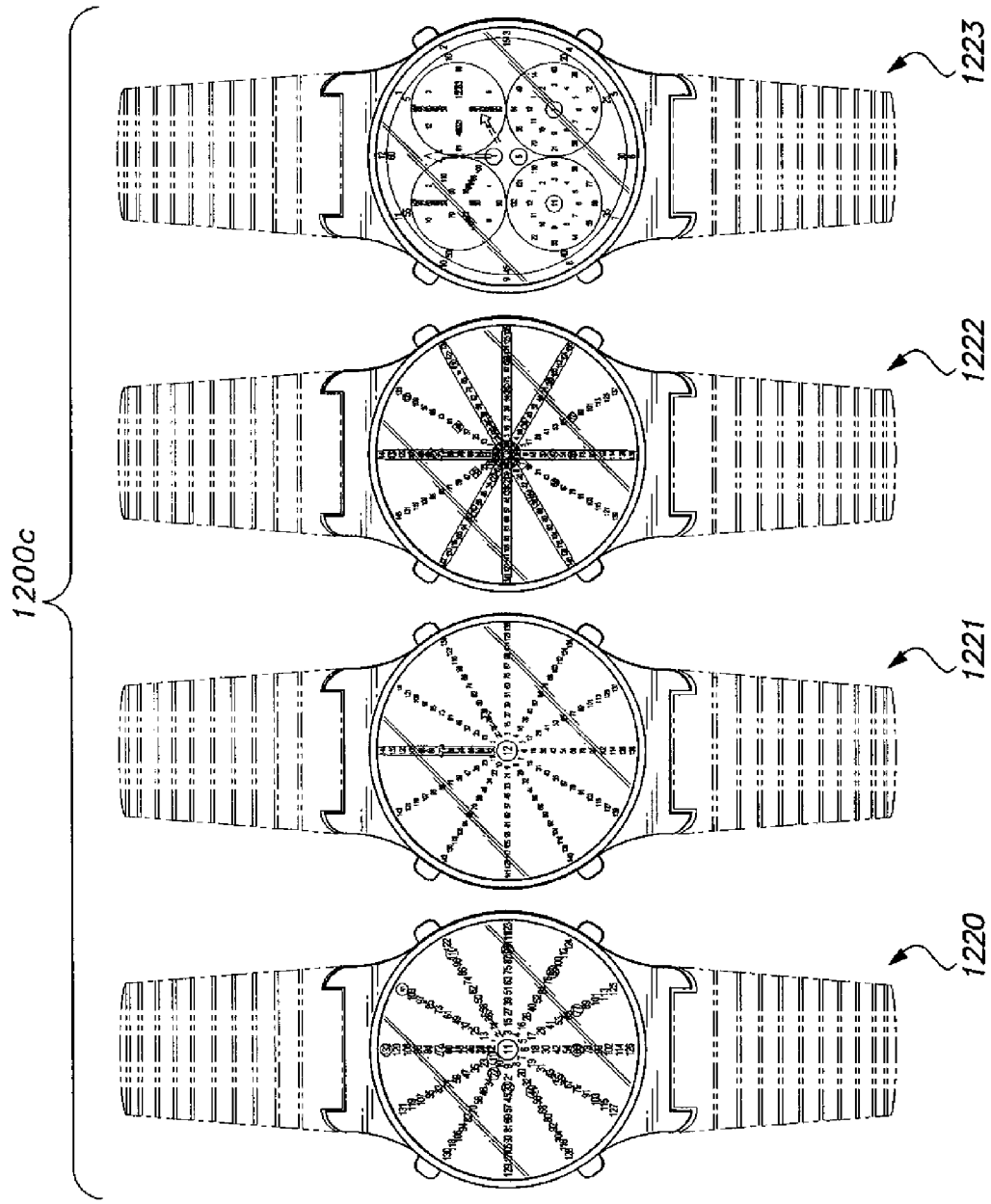

Alternatively, as shown in FIGS. 16A, 16B and 16C, rather than having a programmable variable display, a kit 1200 (divided into 1200a, 1200b and 1200c in FIGS. 16A, 16B and 16C, respectively, for illustrative purposes) of multiple analog timepieces may be provided. In FIGS. 16A, 16B and 16C, a set of fourteen such timepieces 1210, 1211, 1212, 1213, 1214, 1215, 1216, 1217, 1218, 1219, 1220, 1221, 1222 and 1223 are shown, though it should be understood that any desired number of timepieces may be included in kit 1200. Each timepiece includes a unique face 1234, 1222, 1224, etc. as shown, with each face being divided into a central region and a circumferential region. In FIG. 16A, only the faces of timepieces 1210, 1211 and 1212 have been designated with numerals for purposes of simplification, though it should be understood that each timepiece in kit 1200 should have a unique face. In timepiece 1210, which is used for multiplication with a first multiplier of "1", face 1234 is divided into central region 1216 with "1" being displayed therein, and a circumferential region having N=1 annular portions 1218.

Each timepiece has an integer value N between one and twelve displayed in the central region of the face thereof. As in the previous embodiment, N represents a first multiplier, and each face has a circumferential region divided into N annular portions. A set of integers $x_{N(y)}$ are respectively displayed about each of the N annular portions of each circumferential region, where y is an integer ranging between one and twelve such that $x_{1(1)}$ to $x_{1(12)}$ ranges between one and twelve, and $x_{N(y)}=x_{1(y)}+(N-1)\times 12$. Each individual timepiece would be used in a manner similar to that of the previous embodiment, with each of the N timepieces representing a single multiplication table.

It is to be understood that the present invention is not limited to the embodiments described above, but encompasses any and all embodiments within the scope of the following claims.

I claim:

1. A method of teaching multiplication tables, comprising the steps of:

dividing a face of a timepiece into a central region and a circumferential region;

selecting a first multiplier N, wherein N is an integer between one and twelve;

displaying the first multiplier N in the central region;

dividing the circumferential region into N annular portions;

displaying a set of integers $x_{N(y)}$ about each of the N annular portions of the circumferential region, wherein y is an integer ranging between one and twelve such that $x_{1(1)}$ to $x_{1(12)}$ ranges between one and twelve to simulate a face of an analog timepiece, and $x_{N(y)}=x_{1(y)}+(N-1)\times 12$;

displaying at least a simulated hour hand and a simulated minute hand;

positioning the simulated hour hand and the simulated minute hand with respect to an innermost annular portion of the circumferential region to indicate the present time;

selecting a second multiplier M, wherein M is an integer between one and twelve;

graphically identifying the second multiplier M in the N=1 annular portion of the circumferential region;

visually indicating a sequence of clockwise steps made from the second multiplier M to the value of $x_{N(y)}$ equaling N×M, wherein if the product of N×M is greater than twelve, the sequence of clockwise steps follows a clockwise path to each multiple of twelve within a respective one of the N annular portions and continues into the next higher annular portion.

2. The method of teaching multiplication tables as recited in claim 1, further comprising the step of calculating the number of the clockwise steps as (N−1)×M.

3. A method of performing multiplication, comprising the steps of:

dividing a face of a timepiece into a central region and a circumferential region;

selecting a first multiplier N, wherein N is an integer between one and twelve;

displaying the first multiplier N in the central region;

dividing the circumferential region into N annular portions;

displaying a set of integers $x_{N(y)}$ about each of the N annular portions of the circumferential region, wherein y is an integer ranging between one and twelve such that $x_{1(1)}$ to $x_{1(12)}$ ranges between one and twelve to simulate a face of an analog timepiece, and $X_{N(y)}=X_{1(y)}+(N-1)\times 12$;

displaying at least a simulated hour hand and a simulated minute hand;

positioning the simulated hour hand and the simulated minute hand with respect to an innermost annular portion of the circumferential region to indicate the present time;

selecting a second multiplier M, wherein M is an integer between one and twelve;

identifying the second multiplier M in the N=1 annular portion of the circumferential region;

making a sequence of clockwise steps from the second multiplier M to the value of $x_{N(y)}$ equaling N×M, wherein if the product of N×M is greater than twelve, the sequence of clockwise steps follows a clockwise path to each multiple of twelve within a respective one of the N annular portions and continues into the next higher annular portion, the number of the clockwise steps being given by (N−1)×M.

4. The method of performing multiplication as recited in claim 3, wherein the step of identifying the second multiplier includes graphically identifying the second multiplier.

5. The method of performing multiplication as recited in claim 4, wherein the sequence of clockwise steps made from the second multiplier M are visually displayed to the user.

6. A kit of timepieces with multiplication table displays, comprising a set of twelve timepieces, each of the timepieces having:

a face divided into a central region and a circumferential region, each the timepiece having an integer value N between one and twelve displayed in the central region of the face thereof, wherein N represents a first multiplier, each the face having a circumferential region divided into N annular portions, a set of integers $x_{N(y)}$ respectively being displayed about each of the N annular portions of each of the circumferential regions, wherein y is an integer ranging between one and twelve such that $x_{1(1)}$ to $x_{1(12)}$ ranges between one and twelve, and $x_{N(y)}$ =$x_{1(y)}$+(N−1)×12;

an hour hand;

a minute hand; and means for positioning the hour hand and the minute hand with respect to an innermost annular portion of the circumferential region to indicate the present time;

whereby, the user selects a second multiplier M, wherein M is an integer between one and twelve, and identifies the second multiplier M in the N=1 annular portion of the circumferential region, such that the user then may make a sequence of clockwise steps from the second multiplier M to the value of $x_{N(y)}$ equaling N×M, wherein if the product of N×M is greater than twelve, the sequence of clockwise steps follows a clockwise path to each multiple of twelve within a respective one of the N annular portions and continues into the next higher annular portion, the number of the clockwise steps being given by (N−1)×M.

\* \* \* \* \*